United States Patent [19]

Kimura et al.

[11] Patent Number: 4,461,936
[45] Date of Patent: Jul. 24, 1984

[54] CONTACT SENSING DEVICE

[75] Inventors: Kaoru Kimura, Kitakyushu; Mitsuyoshi Nakano, Munakata, both of Japan

[73] Assignee: Yaskawa Electric Mfg. Co., Ltd., Kitakyushu, Japan

[21] Appl. No.: 359,446

[22] Filed: Mar. 18, 1982

[51] Int. Cl.³ .............................................. H01H 3/16
[52] U.S. Cl. ................................................. 200/61.41
[58] Field of Search ............... 200/61.41, 61.42, 11 R, 200/47

[56] References Cited

U.S. PATENT DOCUMENTS 4,301,338  11/1981  McMurtry ..................... 200/6 A X Primary Examiner—J. R. Scott
Attorney, Agent, or Firm—Jordan and Hamburg

[57] ABSTRACT

This invention discloses a contact sensing device for detecting the contact of a moving element such as a welding torch attached to a robot arm with a fixed body. The contact sensing device substantially comprises a support-side member, a work-side member, a spherical bearing mounted on either the support-side member or work-side member, a slide shaft slidably mounted on the spherical bearing, the slide shaft being slidable in an axial direction, an elastic member mounted on the slide shaft for making the work-side member biasingly come into contact with the support-side member, at least three rollers mounted on a first surface of either the support-side member or the work-side member, the rollers capable of coming into contact with a second surface of either the support-side member or the work-side member which opposes the first surface, at least one roller engaging member mounted on the second surface on which one of the rollers runs, and a limit switch actuated by the displacement of the slide shaft.

6 Claims, 7 Drawing Figures

CONTACT SENSING DEVICE

BACKGROUND OF THE INVENTION

This invention relates to a sensing device for detecting the contacting of a moving element with any fixed body, more particularly to a sensing device which can effectively prevent damages on a moving element such as a robot arm which may occur when the element comes into contact with a fixed body.

In case a robot 1 shown in FIG. 1 serves in a welding operation, a welding torch 2 attached to the distal end of the robot arm may come into contact with a work piece or jigs by accident. Such contact accident may be caused by the inaccuracy of the size of the work, the inaccuracy in positioning of the work, or errors in the arm-handling operaion. In such a case, depending on the degree of contact or collision, the welding torch 2 suffers deformation or ruptures, and in the worst case, the robot arm per se is damaged.

In general, when such contact accident occurs, as one of the countermeasures, the operation of the robot is stopped. As another countermeasure, the robot may be provided with means for protecting the arm wrist. For example, as shown in FIG. 2, such arm wrist protecting means may be constructed by interposing a bakelite ring 5 having poor strength against rupture between a support member 3 and a work-side member 4 such as a torch-holder and fastening the bakelite ring 5 therebetween with set screws 6. Due to such construction, when a contact accident occurs, the bakelite ring 5 ruptures thus preventing the influence of the contact accident to the main robot elements.

In the above method, however, since the robot per se is not provided with any sensing ability, the robot continues the movement thereof without performing the required or normal operation until an operator finds out about the rupture of the bakelite ring 5. Furthermore, when the bakelite ring 5 ruptures, the ring must be replaced with a new bakelite ring 5. This implies that the robot must again be provided with a teaching of the programmed operation after repair to resume the programmed operation.

Accordingly, it is an object of the present invention to provide a contact sensing device which can accurately and readily detect the contacting of a work-side member which is mounted on the robot arm or a moving element of any other machines with a fixed body including the work.

DETAILED DESCRIPTION OF DISCLOSURE

The sensing device of the present invention is hereinafter described in detail in view of an embodiment shown in FIG. 3 to FIG. 7.

Figure 1:
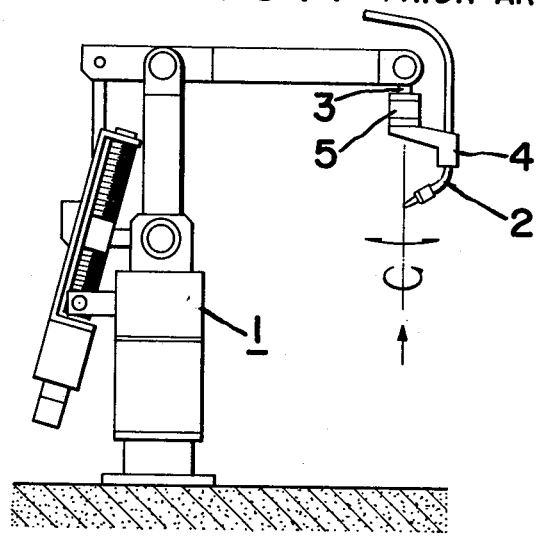
FIG. 1 is a side view of a welding robot provided with a conventional safety device.
Figure 2:
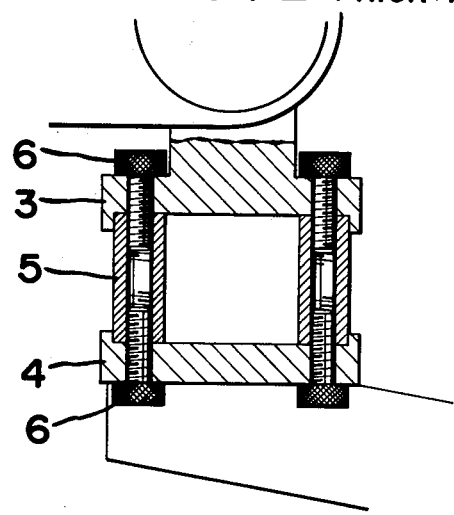
FIG. 2 is an enlarged cross-sectional view of the above safety device.
Figure 3:
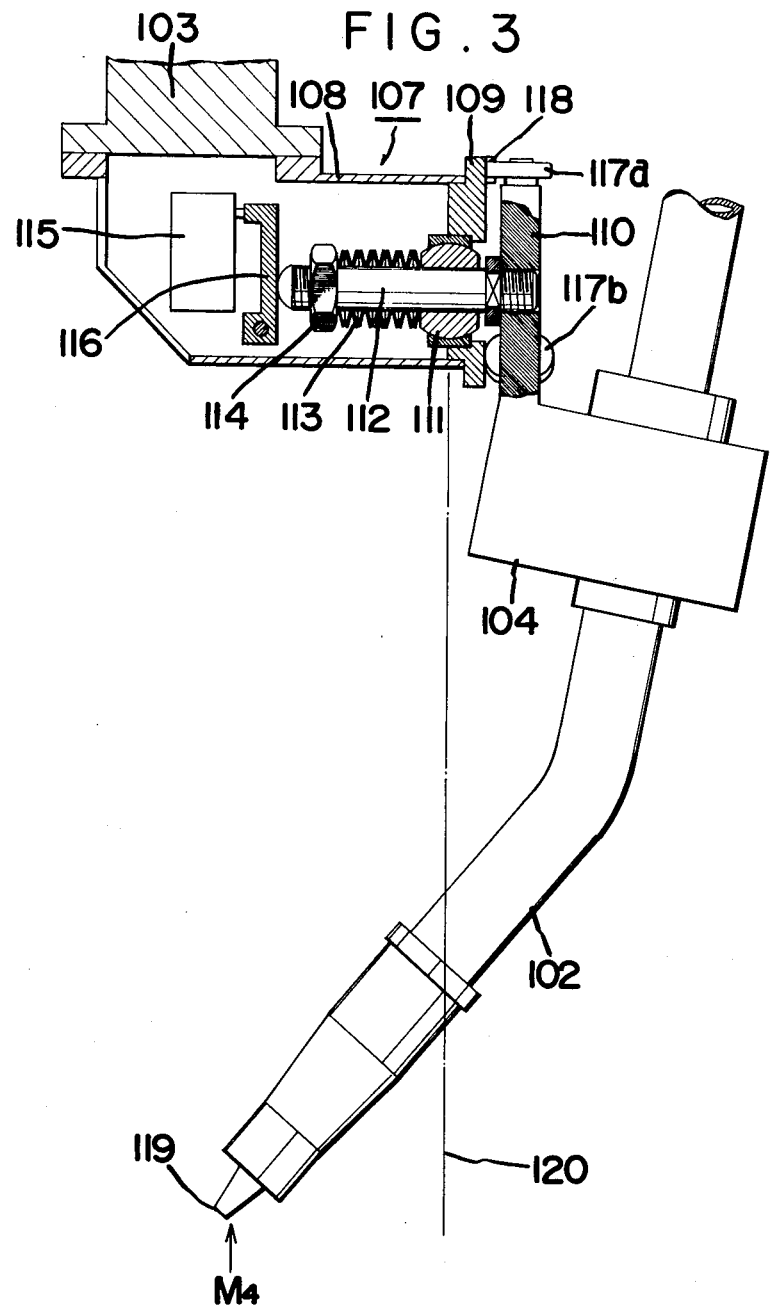
FIG. 3 is a side cross-sectional view of one embodiment of the contact sensing device of the present invention.
Figure 4:
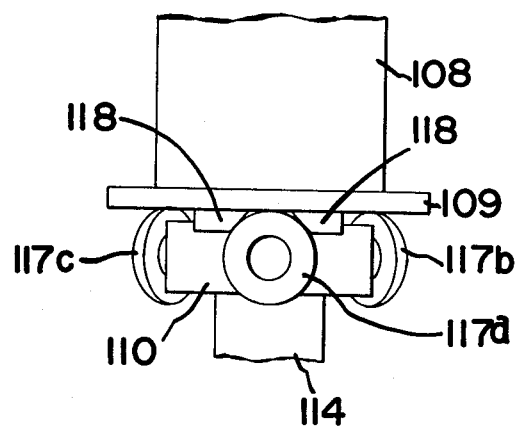
FIG. 4 is a partial view of the above sensing device.
Figure 5:
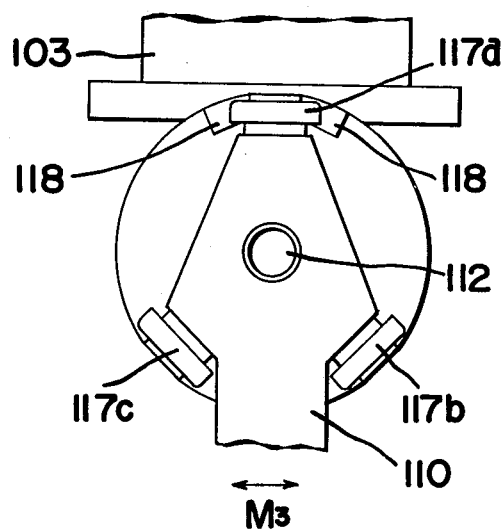
FIG. 5 is a partial front view of the above sensing device.

In FIG. 3 to FIG. 5, numeral 107 indicates a horizontal frame which has the proximal end thereof fixedly secured to the lower end of a support member 103. The frame 107 substantially comprises a horizontal outer frame 108 and a circular end plate 109 which is attached to distal end of the outer frame 108. A mounting plate 110 which forms an integral part of the work-side member 104 is disposed adjacent to the end plate 109, wherein the mounting plate 110 faces the end plate 109 in a parallel spaced-apart manner. The work-side member 104 carries a welding torch 102 in an inclined position. A spherical roller bearing 111 is mounted on the end plate 109 concentrically. A slide shaft 112 is horizontally disposed in the horizontal frame 107 and such slide shaft 112 has one end fixedly threaded into the mounting plate 110 and other end extended into the horizontal frame 107. The extended end of the slide shaft 112 is rounded in a semi-spherical shape. The slide shaft 112 also has an intermediate part thereof slidably received in the spherical bearing 111 and is slidable in an axial direction. An elastic or resilient member 113 is mounted on and along the slide shaft 112 concentrically. Such elastic member 113 is interposed between a nut 114 threaded into the extended end of the slide shaft 112 and the spherical bearing 111. In the drawings, such elastic member 113 comprises a plurality of coned-disc springs which are arranged such that each spring is directed in a direction opposed to the direction of the springs disposed next at both sides of the spring. Due to such construction, the elastic member 113 biasingly presses the mounting plate 110 toward the end plate 109 of the horizontal frame 107. A limit switch 115 and a dog 116 which actuates the limit switch 115 are disposed in the outer frame 108 at a position adjacent to the extended end of the slide shaft 112. Such dog 116 has the lower end thereof pivotally mounted on the outer frame 108 and the upper end thereof interlocked with the limit switch 115, while the dog has an intermediate portion the thereof come into contact with the spherical end of the slide shaft 112. Due to such construction, when the slide shaft 112 is displaced, the dog 116 is rotated to actuate the limit switch 115. A plurality of rollers 117a, 117b, 117c are mounted on the periphery of mounting plate 110 which come into contact with one surface of the circular end plate 109, wherein the roller 117a is mounted generally on the upper part of the plate 110 and the remaining pair of rollers 117a, 117b are mounted generally on the lower periphery of the plate 110 as best shown in FIG. 5. A pair of roller engaging members 118 are mounted on the upper periphery of the circular end plate 109 and such members 118 have inclined surfaces at opposing ends so as to define a recess in which the upper roller 117a is accommodated.

The manner in which the sensing device having the above construction is operated is hereinafter disclosed.

When the work-side member 104 is held in the normal or usual operating position, the rollers 117a, 117b and 117c are biasingly pressed to the end plate 109, wherein the upper roller 117a rests in the recess defined between a pair of the roller engaging members 118.

Figure 6:
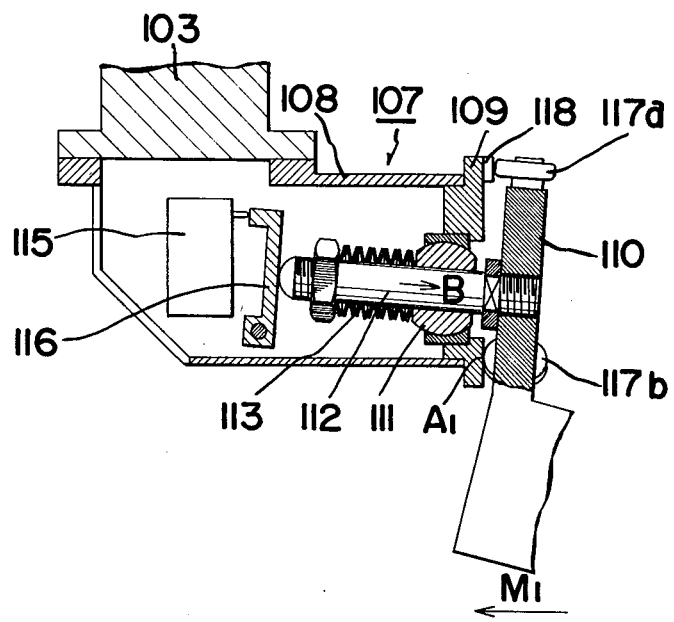
FIG. 6 and FIG. 7 are side views of the above sensing device showing the operation of the above sensing device.

However, when the extremity of the welding torch 102 comes into contact with a fixed body (not shown in the drawing) due to the movement of the support member 103, a force ($M_1$) is applied to the work-side member 104 as shown in FIG. 6. Due to the force ($M_1$), the work-side member 104 is inclined, wherein a contacting position where the pair of lower rollers 117b, 117c come into contact with the end plate 109 works as a fulcrum. Along with this inclining of the work-side member 104, the slide shaft 112 is also inclined by way of the spherical bearing 111 and is moved backward in an arrow direction (B) against the biasing force of the elastic member 113. This provides for the clockwise rotation of the dog 116 which, in turn, actuates the limit switch 115. The limit switch 115, then, readily stops the operation of the robot or retracts the robot from the contacting position.

Figure 7:
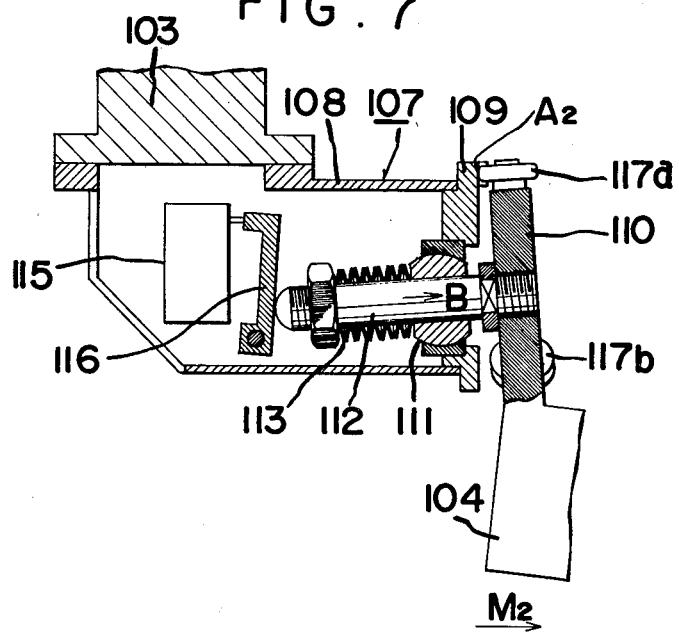

When a force ($M_2$) is applied to the work-side member 104 as shown in FIG. 7, the work-side member 104 is inclined. This time, a position ($A_2$) where the upper roller 117a comes into contact with the end plate 109 works as a fulcrum. Accordingly, the slide shaft 112 is again inclined in a direction opposite to the direction shown in FIG. 6 and is moved in the arrow direction (B), whereby the limit switch 115 is also actuated by way of the dog 116.

Furthermore, as shown in FIG. 5, when a rotating force ($M_3$) is applied to either the work-side member 104 or the slide shaft 112, the roller 117a rotates on the axis of slide shaft 112 along with the rotation of the mounting plate 110 and rolls onto the inclined surface of one of the roller engaging members 118. Accordingly, the work-side member 104 inclines in the same manner as the above mentioned case in which the work-side member 104 receives the thrust force ($M_1$) and makes the slide shaft 112 move backward and actuate the limit switch 115.

As one of the examples in which the outer force is applied to the work-side member 104, a case may be considered where a contacting extremity 119 of the welding torch 102 comes into contact with the fixed body such as the work.

In such case, as shown in FIG. 3, it is preferable to position the extremity 119 of the welding torch 102 away from an imaginary vertical surface 120 which is perpendicular to the axis of the slide shaft 112 and passes through the rotating center of spherical bearing 111. Namely, due to such placement, even when a vertical force ($M_4$) is applied to the contacting extremity 119, a component force is obtained from the force ($M_4$) and such component force is applied to the work-side member 104 in the same manner as the above-mentioned force ($M_1$) ($M_2$) or ($M_3$), whereby the work-side member 104 is inclined to provide the actuation of the limit switch 115.

The rollers 117b and 117c can also be provided with respective roller engaging members 118. In this case, when the force ($M_3$) is applied to the work-side member 104, the slide shaft 112 is moved in an axial direction.

Furthermore, the roller-engaging member 118 may be provided with a low shoulder portion in lieu of the inclined surface on which the roller 117a, 117b, or 117c runs, or the end plate 109 may be provided with recesses which engage with rollers 117a, 117b or 117c.

Still furthermore, the elastic member 113 may be a coil spring or rubber means, while the dog 116 can be incorporated into the limit switch 115 as an integral part thereof.

In summary, the sensing device of this invention substantially comprises a support-side member, a work-side member, a spherical bearing mounted on either the support-side member or work-side member, a slide shaft slidably mounted on the spherical bearing, the slide shaft being slidable in an axial direction, an elastic member mounted on the slide shaft for making the work-side member biasingly come into contact with the support-side member, at least three rollers mounted on a first surface of either the support-side member or the work-side member, the rollers capable of coming into contact with a second surface of either the support-side member or the work-side member which opposes the first surface, at least one roller engaging member mounted on the second surface of which one of the rollers runs, and a limit switch actuated by the displacement of the slide shaft.

Accordingly, in the operation of a robot, even when an outer force which exceeds an allowable limit is applied to the work-side member, the shock incurred by such outer force is alleviated due to the elastic member provided at the connecting portion. Simultaneously, the slide shaft is displaced so as to actuate the limit switch, whereby the necessary measures for protecting the robot including the stoppage of the operation can be readily carried out. This implies that the robot can be protected from damages incurred by any contact accidents.

Furthermore, the distortion of the work-side member is within the elastic limit so that the work-side member is readily released from any internal stress exerted by the above distortion when the work-side member is moved away from the contacting position, whereby the robot can resume the required or programmed operation without necessitating the replacement of parts or re-teaching.

As can be readily understood from the above description, since the sensing device of the present invention can detect an outer force of any direction, the device can be utilized as a contact sensor which accurately and readily detects the contact of an antenna of a floor-movable robot or any movable elements of general industrial machines.

What we claim is:

1. Contact sensing device for detecting contact of a moving element with a fixed body comprising:
    (a) a support-side member having an end plate at one end thereof,
    (b) a work-side member for holding a working jig having a roller mounting plate at one end thereof, said roller mounting plate having a roller mounting surface thereof facing a corresponding roller supporting surface on said end plate of said support-side member,
    (c) a spherical bearing mounted on said end plate of said support-side member,
    (d) a slide shaft disposed in said support-side member and slidably mounted on said spherical bearing, said slide shaft being slidable in an axial direction and pivotable in all radial directions along with the pivoting of said spherical bearing relative to said end plate, said slide shaft having one end passing through said end plate and fixedly connected to the center of said roller mounting plate of said work-side member, the other end of said slide being rounded and having a nut thereon,
    (e) at least three rollers circumferentially mounted on said roller mounting plate of said work-side member, said rollers being operable to contact said roller supporting surface of said end plate of said support-side member, (f) an elastic member mounted on said slide shaft, said elastic member having one end thereof in contact with said nut and the other end in contact with said spherical bearing, thus making said rollers on said roller mounting plate biasingly contact said roller supporting surface of said end plate when said end plate is parallel to said roller mounting plate, (g) at least one roller engaging member mounted on said roller mounting plate along a path on which one of said rollers moves when said roller mounting plate rotates about the axis of said slide shaft, and (h) a limit switch disposed in said support-side member, said limit switch coming into contact with said other end of said slide shaft and being actuated by the axial and radial displacement of said slide shaft which is effected by the movement of said work-side member.

2. Contact sensing device for detecting the contact of a moving element with a fixed body comprising a support-side member, a work-side member, a spherical bearing mounted on said support-side member, a slide shaft slidably mounted on said spherical bearing and slidable in said spherical bearing in an axial direction, said work-side member being mounted on said slide shaft, elastic means mounted on said slide shaft for urging said work-side member biasingly toward said support-side member, roller means mounted on one of said members for biasingly coming into contact with the other of said members, at least one roller engaging member mounted on the other of said members, and a limit switch mounted on said support-side member and actuated by the displacement of said slide shaft, said roller means comprising three spaced rollers mounted on said one member and rollably and biasingly contacting said other member such that when said work-side member is subjected to an externally applied force tending to tilt said work-side member, said work-side member tilts relative to said support-side member and pivots about at least one of said rollers such that said pivoting support-side member displaces said slide shaft to thereby actuate said limit switch, said roller engaging member being constructed and arranged such that when said work-side member is subjected to an externally applied force tending to rotate said work-side member, said work-side member rotates relative to said support-side member as one of said rollers rolls up on said roller engaging member and said work-side member thereby pivots about at least one of said other rollers such that said pivoting support-side member displaces said slide shaft to thereby actuate said limit switch, whereby said limit switch is actuated upon rotation and tilting of said work-piece member.

3. Contact sensing device according to claim 2, wherein said three rollers are rotatably mounted on said work-side member.

4. Contact sensing device according to claim 3, wherein said support-side member has an end surface on which said rollers rotate, said roller engaging member having a raised surface disposed on said end surface onto which said one roller is adapted to roll.

5. Contact sensing device according to claim 4, wherein said roller engaging member has a pair of said raised surfaces disposed on either side of said one roller and onto which said one roller is adapted to roll.

6. Contact sensing device according to claim 2, wherein said slide shaft has a nut means on one longitudinal end portion thereof, said elastic means being disposed on said slide shaft between said nut means and said spherical bearing such that said elastic means biasingly urges said work-side member towards said support-side member.

* * * * *